G. M. HYNDES.
AUTOMATIC BALL BEARING SIDE BEARING FOR RAILROAD TRUCKS.
APPLICATION FILED DEC. 22, 1920.
1,429,737.  Patented Sept. 19, 1922.
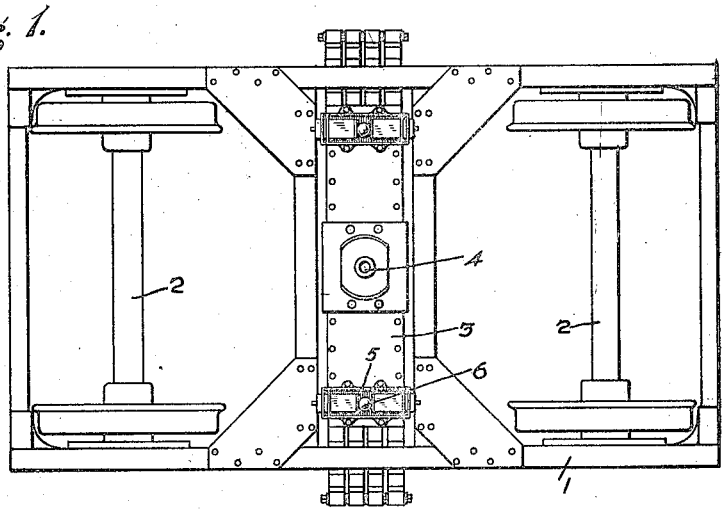
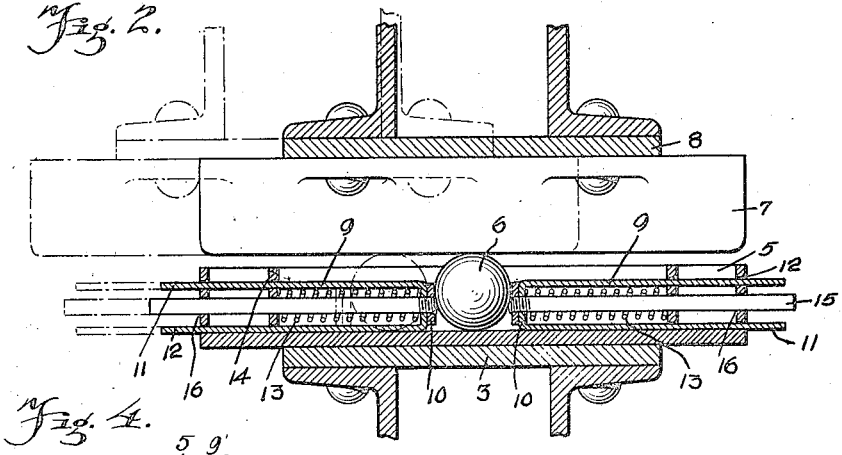
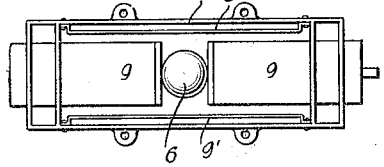
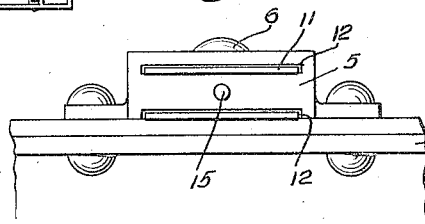
WITNESSES
INVENTOR
GEORGE M. HYNDES
BY
ATTORNEYS Patented Sept. 19, 1922.

1,429,737

UNITED STATES PATENT OFFICE.

GEORGE M. HYNDES, OF DALLAS, TEXAS.

AUTOMATIC BALL-BEARING SIDE BEARING FOR RAILROAD TRUCKS.

Application filed December 22, 1920. Serial No. 432,491.

*To all whom it may concern:*

Be it known that I, GEORGE M. HYNDES, a citizen of the United States, and a resident of Dallas, in the county of Dallas and State of Texas, have invented a new and Improved Automatic Ball-Bearing Side Bearings for Railroad Trucks, of which the following is a full, clear, and exact description.

This invention relates to bearings for trucks, and has particular reference to a new and improved form of side bearing.

An object of the invention resides in the provision of means whereby the friction between the side bearing on trucks and co-operating elements on the car body is reduced to a minimum.

Another object resides in the provision of a simple, compact and efficient apparatus which can be readily attached to any type of truck without the need for special apparatus, tools or appliances.

A further object resides in the provision of a side bearing which is readily assembled and disassembled and repaired and is economically manufactured.

A still further object resides in the particular construction and arrangement of parts hereinafter described and claimed and shown in the accompanying drawings.

Heretofore side bearings have been formed of plates which received part of the weight of the car bodies when these bodies tilted and swayed due to the relative angular movement of the machinery with respect to the car body, especially in rounding curves. The friction between these plates is objectionable, and when the relative movement between the truck and the car body exceeded a certain maximum, the plates were liable to become interlocked, preventing the return of the truck to normal position with respect to the car body, and often resulting in accidents.

By reason of my invention, I have provided a simple rolling bearing mounted within a suitable casing on a truck which is adapted to be maintained in a certain normal position but which is maintained in this normal position by resilient abutments so that when this bearing engages a bearing plate or other mechanism on the under body of the car and the truck tends to move relatively and angularly with respect to the car body the rolling bearing will move not only on its own axis but linearly with respect to the truck, so that a single, simple bearing can perform the function of the cumbersome, inefficient plates heretofore used. This bearing, as soon as the truck and the car body resume their normal relative positions and the weight is taken off the bearing, is instantly restored to its normal position by the resilient abutments or positioning devices.

The invention is illustrated in the drawings, in which—

Figure 1 is a plan view of a truck provided with side bearing members made in accordance with my invention;

Figure 2 is a partial vertical longitudinal section through the side bearing showing its relation with the bearing plate on the under portion of the car body;

Figure 3 is an end view of the side bearing on the truck; and

Figure 4 is a perspective view of the bearing casing showing the provision of additional spring plates.

As shown in the drawings, my invention in its preferred form is applied to a truck frame 1 suitably mounted on car wheel shafts 2 and provided with a truck bolster 3 of any suitable or well-known type. The truck bolster is provided with means 4 for supporting any suitable king bolt connection between the truck and the car body with which it is adapted to co-operate.

As shown particularly in Figures 2 and 3, the side bearing unit comprises a rectangular shallow receptacle or casting 5 within which a ball or rolling bearing 6 is disposed. This bearing is adapted under certain conditions to contact with a side bearing plate or other mechanism 7 carried usually on the underside of the car body 8 over the bearing 6. In Figure 2, the dotted lines indicate the positions which the bearing plate 7 and the rolling bearings 6 may assume when the angular relation between the truck and the car body vary from normal. During this movement the rolling bearing is moved from its normal position, shown in full lines in Figure 2. The relative movement between the truck and the car body may not only be angular but lateral and longitudinal, but, nevertheless, the rolling bearing 6 is provided to aid in supporting the car body regardless of the direction which the relative movement between the car body and the truck takes.

In order that the rolling bearing 6 may be restored to its normal medial position when the body and the truck have returned to normal position, I have provided resilient abutments or casings 9 which are in the form of U-shaped plates with the faces of the U disposed adjacent the rolling bearing 6 in the ends of the U, such as 11, extending through suitable slots 12 in the opposite ends of the casting 5. A spring 13 is disposed within each abutment between the inner face of the base of the U and a partition 14 and surrounds a rod 15 which is attached at one end to the abutment 9 and at the other end extends through an aperture 16 in the outer end of the casting 5. The spring 13 will tend to force the rolling bearing 6 back to a normal position, the opposing action of the other spring of the pair holding the rolling bearing 6 in this normal position as long as no extraneous force is applied to the rolling bearing. However, whenever, the weight of the car, through the bearing plate 7, is applied to the rolling bearing 6 to move it longitudinally, angularly or laterally with respect to the casting 5 and the truck frame 1, one or the other of the resilient abutments 9 will be moved out of its normal position against the action of the spring 13, thus permitting the ball to move in any direction within the casting or receptacle 5. The sides of the casting 5 are provided with spring plates 9' which are suitably fastened at their ends in any desired manner to the casing, and throughout the remainder of their length are spaced a definite distance from the sides of the casing to provide a resilient face with which the balls 6 may contact. The provision of these spring plates at the sides of the casing 9 is to prevent the ball 6 from rolling too far out of the central portion of the casing, so that it can always be engaged by the abutments 9. The sides of this casing or receptacle and the sides of the rolling bearing are designed to enable them to meet the maximum stress and the maximum amount of movement, so that the bearing is always capable of performing its functions, and when released from this performance will return instantly to its normal position ready to resume its operation when called upon.

It will be apparent that many minor modifications can be made in the construction and arrangement of the parts without departing from the spirit of the invention.

What I claim is:

1. A side bearing for trucks, which comprises a shallow receptacle disposed on the car truck, a single ball disposed within said receptacle to receive the weight of the car, longitudinally movable abutment plates disposed across the receptacle on opposite sides of the ball, spring means engaging each of said plates to hold them in the normal forward position engaging the ball, the receptacle having a width considerably greater than the diameter of the ball to permit lateral movement thereof with respect to the receptacle, the ball being adapted when bearing the weight of the car to move substantially the entire length and width of the receptacle, if necessary, whereby rolling friction is produced between the car and the ball when the car moves with relation to the truck.

2. A side bearing for trucks, which comprises a shallow receptacle, a single ball disposed therein to support the weight of the car, the width of the receptacle being considerably greater than the diameter of the ball to permit rolling friction between the ball and the car, and a pair of U-shaped restraining plates disposed on opposite sides of the ball longitudinally of the receptacle, the base of the U-shaped plates disposed normally against the ball and held thereagainst by the action of the spring, the path of movement of the ball longitudinally being only restricted by the length of the path of movement of the plates, and laterally only by the walls of the receptacle, so that the maximum movement is permitted.

GEOR. M. HYNDES.